(12) United States Patent
Fan

(10) Patent No.: US 10,086,545 B2
(45) Date of Patent: Oct. 2, 2018

(54) METHOD OF FORMING PACKAGED LENS MODULES

(71) Applicant: Regis Fan, Shanghai (CN)

(72) Inventor: Regis Fan, Shanghai (CN)

(73) Assignee: OMNIVISION OPTOELECTRONICS TECHNOLOGIES (SHANGHAI) CO., LTD., Shanghai (CN)

(*) Notice: Subject to any disclaimer, the term of this patent is extended or adjusted under 35 U.S.C. 154(b) by 267 days.

(21) Appl. No.: 14/869,578

(22) Filed: Sep. 29, 2015

(65) Prior Publication Data

US 2017/0087755 A1 Mar. 30, 2017

(51) Int. Cl.
*B29C 45/16* (2006.01)
*G02B 7/20* (2006.01)
*B29D 11/00* (2006.01)
*G02B 13/00* (2006.01)

(52) U.S. Cl.
CPC .... *B29C 45/1657* (2013.01); *B29D 11/00009* (2013.01); *G02B 7/20* (2013.01); *G02B 13/001* (2013.01)

(58) Field of Classification Search
CPC .......... B29C 45/1657; B29D 11/00009; G02B 13/001; G02B 7/20
See application file for complete search history.

(56) References Cited

U.S. PATENT DOCUMENTS 7,796,336 B2 * 9/2010 Louh ................ B29D 11/00298
264/1.38
8,000,041 B1 * 8/2011 Lin .................. B29D 11/00375
359/619

* cited by examiner

*Primary Examiner* — John C Hong
(74) *Attorney, Agent, or Firm* — Womble Bond Dickinson (US) LLP

(57) ABSTRACT

A method of forming packaged lens modules is disclosed which includes: securing first ends of a plurality of lens modules equidistantly on a first mold plate; providing a second mold plate matching with second ends of the lens modules and securing the second mold plate on the second ends of the lens modules; filling a black material in gaps between the lens modules; and removing the first and second mold plates after the black material is cured and performing a dicing process. The method can effectively block lens openings to protect lenses from being contaminated and can eliminate the need for adhesive application and removal generally performed on second ends of the lens modules, thereby resulting in time savings and an efficiency improvement. Additionally, a height of the resulting packaged lens modules can be modified for back focal length compensation thereof by changing the size of the second mold plate.

10 Claims, 3 Drawing Sheets

METHOD OF FORMING PACKAGED LENS MODULES

CROSS-REFERENCES TO RELATED APPLICATIONS

This application claims the priority of Chinese patent application number 201410520715.X, filed on Sep. 30, 2014, the entire contents of which are incorporated herein by reference.

TECHNICAL FIELD

The present invention relates to the field of semiconductor technology, and more particularly to a method of forming packaged lens modules.

BACKGROUND

Digital cameras have been widely used in a variety of applications. With the advent of some new applications, such as cellular phones and medical appliances, digital cameras are miniaturized to be adapted for easy mounting. Accordingly, camera module, a component of digital cameras, is required to have low manufacturing cost and small horizontal and vertical occupation areas for its suitability for many applications. Such camera modules may be manufactured on a single wafer by using wafer-level technology and packaging technology, and then the wafer-level camera modules are singulated into individual camera modules.

A conventional camera module is typically constituted of an image sensing component and a lens module disposed on the image sensing component. The lens module includes a lens which regulates incident light in order for the image sensing component to capture images efficiently. The lens module also includes a black material which encapsulates the lens to block unwanted light.

In the existing methods for fabricating the conventional lens modules, the black material is formed by a coating process which generally includes the following steps: 1) covering the top of a lens module, where a lens opening is defined, with an adhesive layer for temporarily blocking the lens opening; 2) curing the adhesive layer; 3) coating the black material; and 4) removing the adhesive layer covering the top of the lens module to expose the lens opening. Afterward, the lens module coated with the black material can be attached to a sensor substrate bearing integrated circuitry, forming a packaged lens module which can be subsequently built into a camera module after undergoing further processes.

These conventional methods of forming packaged lens modules include the steps of coating and removing the adhesive layer, thus increasing the complexity of the methods and may also bring risks of causing physical damages to the lens in the lens opening when removing the adhesive layer and/or causing imaging performance degradation of the camera modules being fabricated due to adhesive residues.

SUMMARY OF THE INVENTION

It is therefore an objective of the present invention to provide a method of fabricating packaged lens modules, which is simpler, more time-saving and more efficient over the conventional methods while allowing height adjustability and back focal length compensation of the packaged lens modules.

In accordance with the above and further objectives of the invention, a method of fabricating packaged lens modules includes the steps of:

step S01: securing first ends of a plurality of lens modules equidistantly on a first mold plate;

step S02: providing a second mold plate matching with second ends of the plurality of lens modules and securing the second mold plate on the second ends of the plurality of lens modules;

step S03: filling a black material in gaps between the plurality of lens modules; and step S04: removing the first and second mold plates after the black material is cured.

Optionally, the plurality of lens modules may include a plurality of lens assemblies which have an identical design value of back focal length and an identical design value of front-diaphragm size.

Optionally, the first mold plate may include a first body and a plurality of first supports equidistantly arranged on the first body, and a size of each of the plurality of first supports matches with the front-diaphragm size of each of the plurality of lens assemblies.

Optionally, the second mold plate may include a second body, a plurality of protrusions equidistantly arranged on the second body, and a plurality of second supports disposed on the plurality of protrusions, and a vertical size of the plurality of second supports matches with the back focal length of each of the plurality of lens assemblies.

Optionally, the first mold plate may be formed of a flexible material.

Optionally, the black material may be filled by injection molding in step S03.

Optionally, the method may further include performing a dicing process to form a plurality of lens units, each of the plurality of lens units including a corresponding one of the plurality of lens modules and portions of the black material attached to both side thereof.

Optionally, the method may further include flipping each of the lens units and attaching each of the flipped lens units to a sensor substrate bearing an integrated circuitry by attaching the portions of the black material to the sensor substrate.

Optionally, a horizontal size of each of the plurality of protrusions matches with a size of a corresponding sensor substrate.

Optionally, a horizontal relative position of each of the plurality of lens modules with respect to a corresponding sensor substrate is determined by a horizontal relative position of each of the plurality of protrusions with respect to the corresponding ones of the plurality of second supports.

From the above description, it can be understood that the method of this invention has the following advantages over the conventional methods.

First, fixing the lens modules between the first and second mold plates can provide effective shielding to their lens openings and hence ensure the lenses in the lens openings not to be contaminated during the filling of the black material into the gaps between the lens modules. This eliminates the need to form and remove the adhesive layer on and from the second ends of the lens modules, thus resulting in time savings and an efficiency improvement.

Second, the use of the second mold plate that is consisted of a body, protrusions equidistantly arranged on the body, and the second supports disposed on the protrusions and the arrangement that the horizontal size of the protrusions may match with a size of sensor substrates to be attached to the lens modules in a subsequent process, while the vertical size of the second supports matches with the back focal length of the lens assemblies allows height adjustability and back focal length compensation of the packaged lens modules.

Third, enclosing the lens modules in the confined space delimited by the first and second mold plates and filling the black material into the gaps between the lens modules by injection molding can result in process simplification and product performance reliability.

DETAILED DESCRIPTION OF EXEMPLARY EMBODIMENTS

The present invention will become apparent from the following detailed description of illustrative embodiments thereof, which is to be read in connection with the accompanying drawings. It is to be understood that the present invention is not limited to the embodiments set forth below and any alternative thereto generally known by those skilled in the art also falls in the scope of the invention.

In addition, the accompanying drawings that are merely intended to facilitate the explanation of the invention may not be drawn to scale for the sake of clarity or simplicity, and should thus not be construed as limiting the present invention in any way.

The core principle of the present invention is to simplify the conventional packaged lens module fabrication methods to make it more time-saving and more efficient by fixing a plurality of lens modules between a first mold plate and a second mold plate and filling a black material in gaps between the lens modules.

Figure 1:
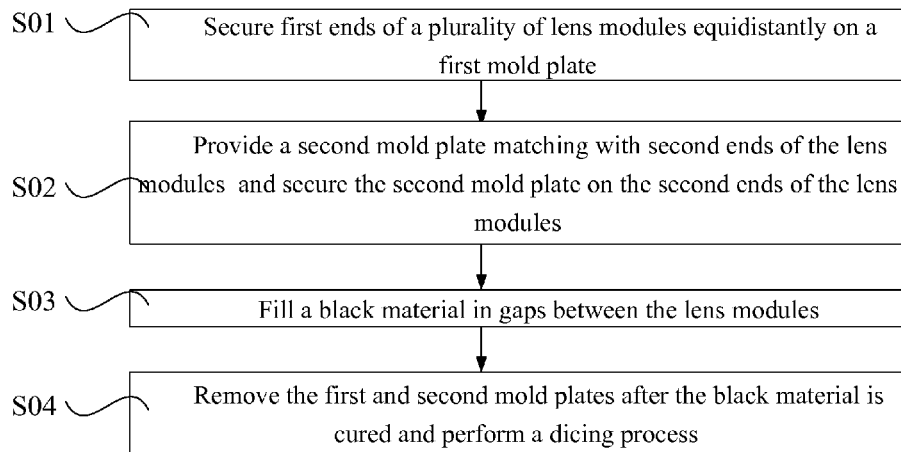
FIG. 1 depicts a flowchart graphically illustrating a method of fabricating packaged lens modules in accordance with an embodiment of the present invention.

Referring now to FIG. 1, which is a flowchart illustrating a method of fabricating packaged lens modules in accordance with an embodiment of the present invention. As illustrated, the method includes the steps of:

step S01: securing first ends of a plurality of lens modules equidistantly on a first mold plate;

step S02: providing a second mold plate matching with second ends of the plurality of lens modules and securing the second mold plate on the second ends of the plurality of lens modules;

step S03: filling a black material in gaps between the plurality of lens modules; and step S04: removing the first and second mold plates after the black material is cured and performing a dicing process.

FIGS. 2 to 6 schematically illustrate the steps of the method of fabricating packaged lens modules in accordance with this embodiment. The present invention will be described in greater detail with reference to FIG. 1, in conjunction with FIGS. 2 to 6.

Figure 2:
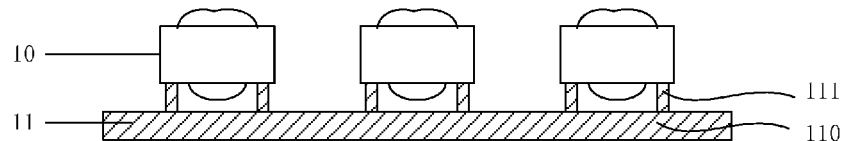
FIGS. 2 to 6 are schematics illustrating the steps of the method of fabricating packaged lens modules in accordance with the embodiment of the present invention.

In step S01, provide a plurality of lens modules 10 and fix first ends of the plurality of lens modules 10 equidistantly on a first mold plate 11, resulting in a structure as shown in FIG. 2. In this embodiment, the lens modules 10 include lens assemblies and are disposed upside down on the first mold plate 11. That is, the lens assembly of each lens module 10 has its top facing toward the first mold plate 11. The lens assemblies have an identical design value of back focal length and an identical design value of front-diaphragm size. Although the design values of the lens assemblies are identical, those skilled in the art shall appreciate that the back focal lengths of the lens assemblies actually fabricated will not be exactly the same but within a certain tolerance range, for example, ±5 µm or ±10 µm, or other ranges. The actual back focal lengths and tolerance range of the lens assemblies can be determined according to measurement results.

The first mold plate 11 may include a first body 110 and a plurality of first supports 111 equidistantly arranged on the first body 110. A size of the first supports 111 may match with the front-diaphragm size of the lens assemblies. In this embodiment, each of the first supports 111 assumes an annular shape and supports a corresponding lens module 10 at its first end. Additionally, the first mold plate 11 is formed of a flexible material to facilitate the securing of the lens modules 10. In other embodiments, the first mold plate 11 may also be formed of other materials known by those skilled in the art.

Figure 3:
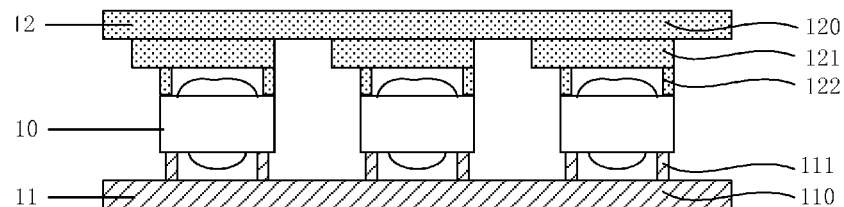

In step S02, a second mold plate 12 that is able to be matched with second ends of the lens modules 10 is provided, and the second mold plate 12 is fixed on second ends of the lens modules 10, resulting in a structure as shown in FIG. 3.

Figure 7:
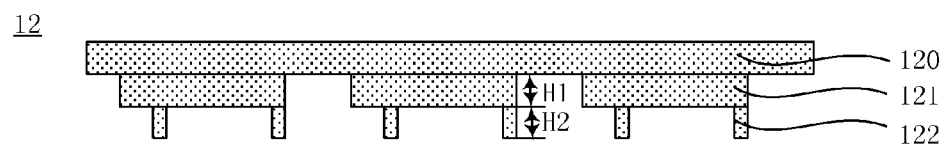
FIG. 7 schematically illustrates a second mold plate used in the method of fabricating packaged lens modules in accordance with the embodiment of the present invention.

As shown in FIG. 7, the second mold plate 12 may include a second body 120, a plurality of protrusions 121 equidistantly arranged on the second body 120, and a plurality of second supports 122 disposed on the protrusions 121. The horizontal size of the protrusions 121 may match with a size of sensor substrates 16 to be attached to the lens modules 10 in a subsequent process, while the vertical size of the second supports 122 may match with the back focal length of the lens assemblies. In this embodiment, each of the second supports 122 assumes an annular shape and supports a corresponding lens module 10 at its second end.

In this embodiment, the first end of each lens module 10 corresponds to the top of the lens assembly in the specific lens module 10, where the front-diaphragm size is defined, and the second end of the specific lens module 10 corresponds to the bottom of the lens assembly, where the back focal length is defined.

Figure 4:
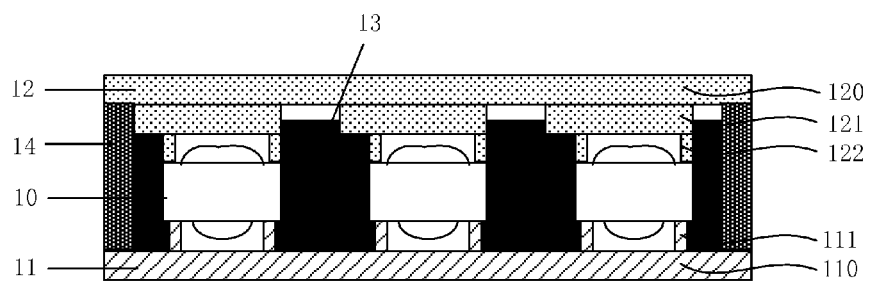

In step S03, a black material 13 is filled in gaps between the lens modules 10, resulting in a structure as shown in FIG. 4.

The black material 13 may be filled by means of injection molding. This can be accomplished by the following steps: 1) after step S02, attaching an isolating plate 14 to each lengthwise side of the first mold plate 11 and the corresponding lengthwise side of the second mold plate 12, so that the first and second mold plates 11 and 12 and the isolating plates 14 together delimit a confined space where the plurality of lens modules 10 are disposed in; 2) vacuuming the confined space; and 3) filling the black material 13 into the confined space by the air pressure difference, such that each gap between every adjacent two of the lens modules 10 is fully filled with the black material 13. As the annular first and second supports 111 and 122 of the first and second mold plates 11 and 12 support the lens modules 10 at their first and second ends, their lens openings are effectively blocked during this filling process and the lens in the lens openings are protected from being contaminated by the black material 13.

Figure 5:
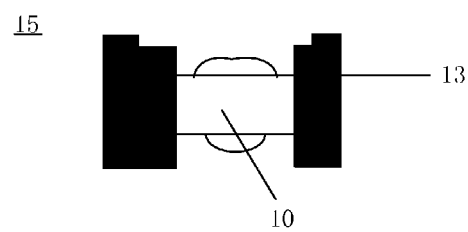

In step S04, the first and second mold plates 11 and 12 are removed after the black material 13 is cured and a remaining structure resulting from the removal is diced on a dicing tape into a plurality of lens units 15, as shown in FIG. 5. Each lens unit 15 is comprised of a corresponding one of the lens modules 10 and portions of the black material 13 attached to both sides of the specific lens module 10.

Figure 6:
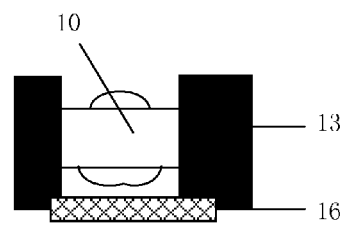

Afterward, each lens unit 15 is flipped over and attached to a sensor substrate 16 bearing integrated circuitry by attaching the black material 13 of the specific lens unit 15 to the sensor substrate 16, thereby forming the packaged lens modules as shown in FIG. 6.

As can be seen from FIGS. 2 to 6, alterations in a size of the second mold plate 12 can lead to changes in the distance from the lens assemblies to the corresponding sensor substrates 16, i.e., lead to height adjustments of the resulting packaged lens modules. Additionally, horizontal relative positions of the lens modules 10 with respect to the sensor substrates 16 can be adjusted primarily by altering the lengths and/or widths of the protrusions 121 of the second mold plate 12 so as to assure alignment of the lens assemblies to the sense active areas of the sensor substrates 16. Still more specifically, as shown in FIG. 7, the height of the packaged lens modules is determined (adjustable) by changing the height H1 of the protrusions 121 and the height H2 of the second supports 122. In addition, as the first end of each lens module 10 corresponds to the bottom of the lens assembly thereof, alterations in the size of the second mold plate 12 can also result in changes in the back focal length of the lens assemblies. This can be utilized to compensate for the deviations in back focal lengths of the fabricated lens assemblies.

Figure 8:
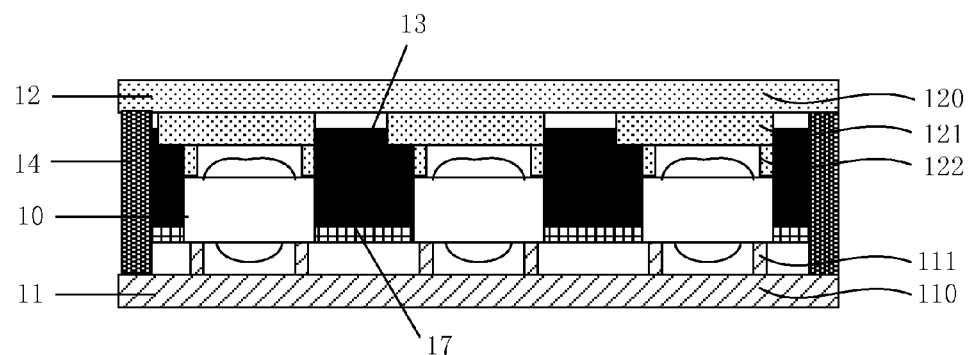
FIG. 8 is a schematic illustrating a method of fabricating packaged lens modules in accordance with an alternative embodiment of the present invention.

In an alternative embodiment, the plurality of lens modules 10 are interconnected by connecting members 17. In this embodiment, the isolating plates 14 may also be used together with the first and second mold plate 11 and 12 to form the confined space and the black material 13 may be similarly filled in this confined space, resulting in the structure as shown in FIG. 8. In this embodiments, as the confined space is relatively small, it is easier to be vacuumed and requires a less amount of the black material 13 to be filled in, thus leading to production cost reduction and efficiency improvement.

As described above, fixing the lens modules between the first and second mold plates can provide effective shielding to their lens openings and hence ensure the lenses in the lens openings not to be contaminated during the filling of the black material into the gaps between the lens modules. This eliminates the need to form and remove the adhesive layer on and from the second ends of the lens modules, thus resulting in time savings and an efficiency improvement. In addition, the use of the second mold plate that is consisted of a body, protrusions equidistantly arranged on the body, and second supports disposed on the protrusions and the horizontal size of the protrusions may match with a size of sensor substrates to be attached to the lens modules, while the vertical size of the second supports may match with the back focal length of the lens assemblies. The arrangement allows horizontal position adjustability and back focal length compensation of the packaged lens modules. Further, enclosing the lens modules in the confined space delimited by the first and second mold plates and filling the black material into the gaps between the lens modules by injection molding can result in process simplification and product performance reliability.

Whilst there have been described in the foregoing description preferred embodiments of the present invention, it is to be understood that the invention is not limited in any way to the embodiments described. It is intended that all modifications and variations made in light of what has been disclosed above fall within the scope of the appended claims.

What is claimed is:

1. A method of forming packaged lens modules, comprising the steps of:
    step S01: securing bottoms of a plurality of lens modules equidistantly on a first mold plate;
    step S02: providing a second mold plate matching with tops of the plurality of lens modules and securing the second mold plate on the tops of the plurality of lens modules;
    step S03: filling a black material in gaps between the plurality of lens modules; and
    step S04: removing the first and second mold plates after the black material is cured.

2. The method of claim 1, wherein the plurality of lens modules include a plurality of lens assemblies having an identical design value of back focal length and an identical design value of front-diaphragm size.

3. The method of claim 2, wherein the first mold plate comprises a first body and a plurality of first supports equidistantly arranged on the first body, and wherein a size of each of the plurality of first supports matches with the front-diaphragm size of each of the plurality of lens assemblies.

4. The method of claim 2, wherein the second mold plate comprises a second body, a plurality of protrusions equidistantly arranged on the second body, and a plurality of second supports disposed on the plurality of protrusions, and wherein a vertical size of the plurality of second supports matches with the back focal length of each of the plurality of lens assemblies.

5. The method of claim 3, wherein the first mold plate is formed of a flexible material.

6. The method of claim 1, wherein in step S03, the black material is filled by an injection molding process.

7. The method of claim 1, further comprising performing a dicing process to form a plurality of lens units, each of the plurality of lens units comprising a corresponding one of the plurality of lens modules and portions of the black material attached to both side thereof.

8. The method of claim 7, further comprising flipping each of the lens units and attaching each of the flipped lens units to a sensor substrate bearing an integrated circuitry by attaching the portions of the black material to the sensor substrate.

9. The method of claim 8, wherein the second mold plate comprises a second body, a plurality of protrusions equidistantly arranged on the second body, and a plurality of second supports disposed on the plurality of protrusions, and wherein a horizontal size of each of the plurality of protrusions matches with a size of a corresponding sensor substrate.

10. The method of claim 9, a horizontal relative position of each of the plurality of lens modules with respect to a corresponding sensor substrate is determined by a horizontal relative position of each of the plurality of protrusions with respect to the corresponding one of the plurality of second supports.

\* \* \* \* \*